Figure 1:
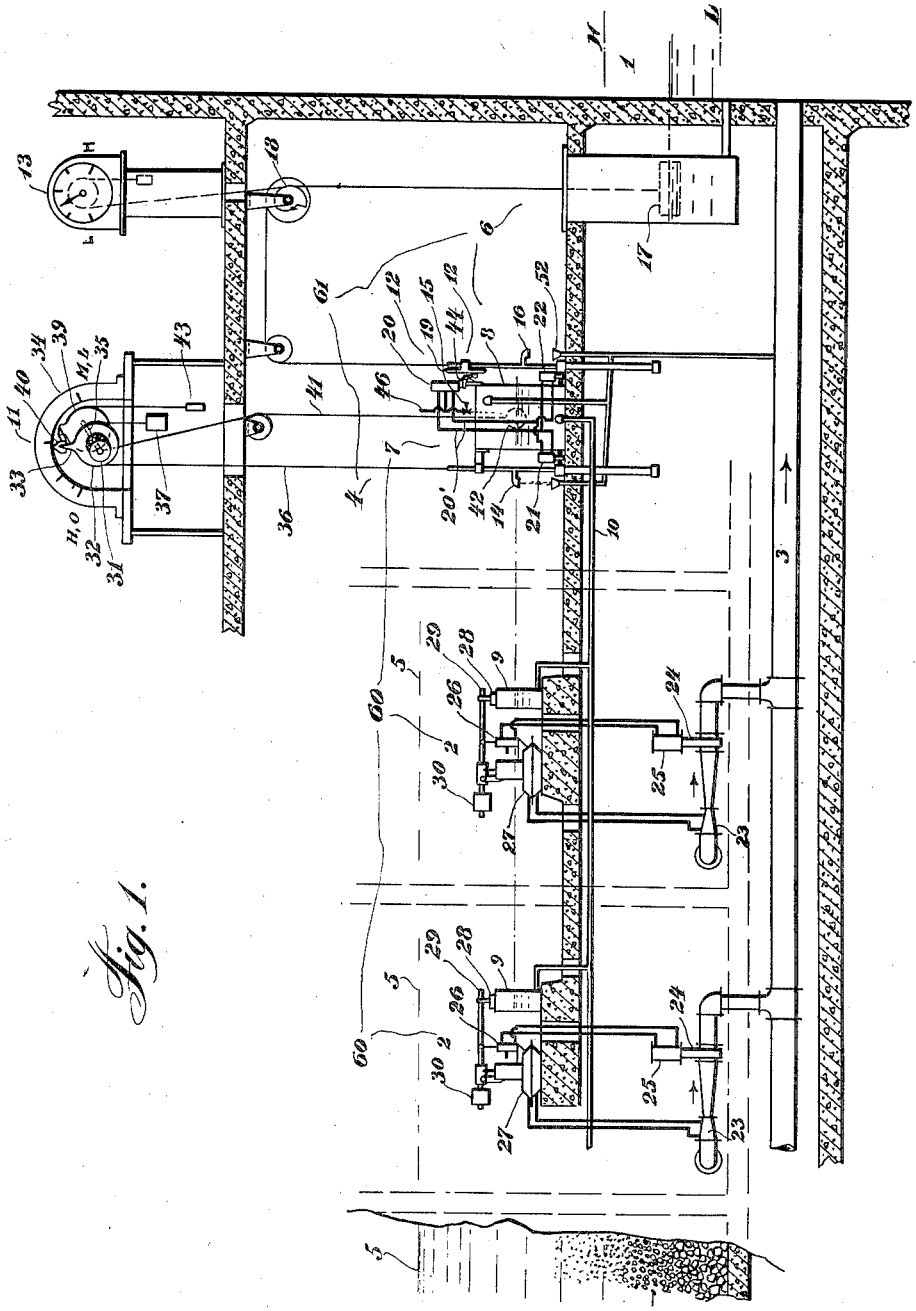

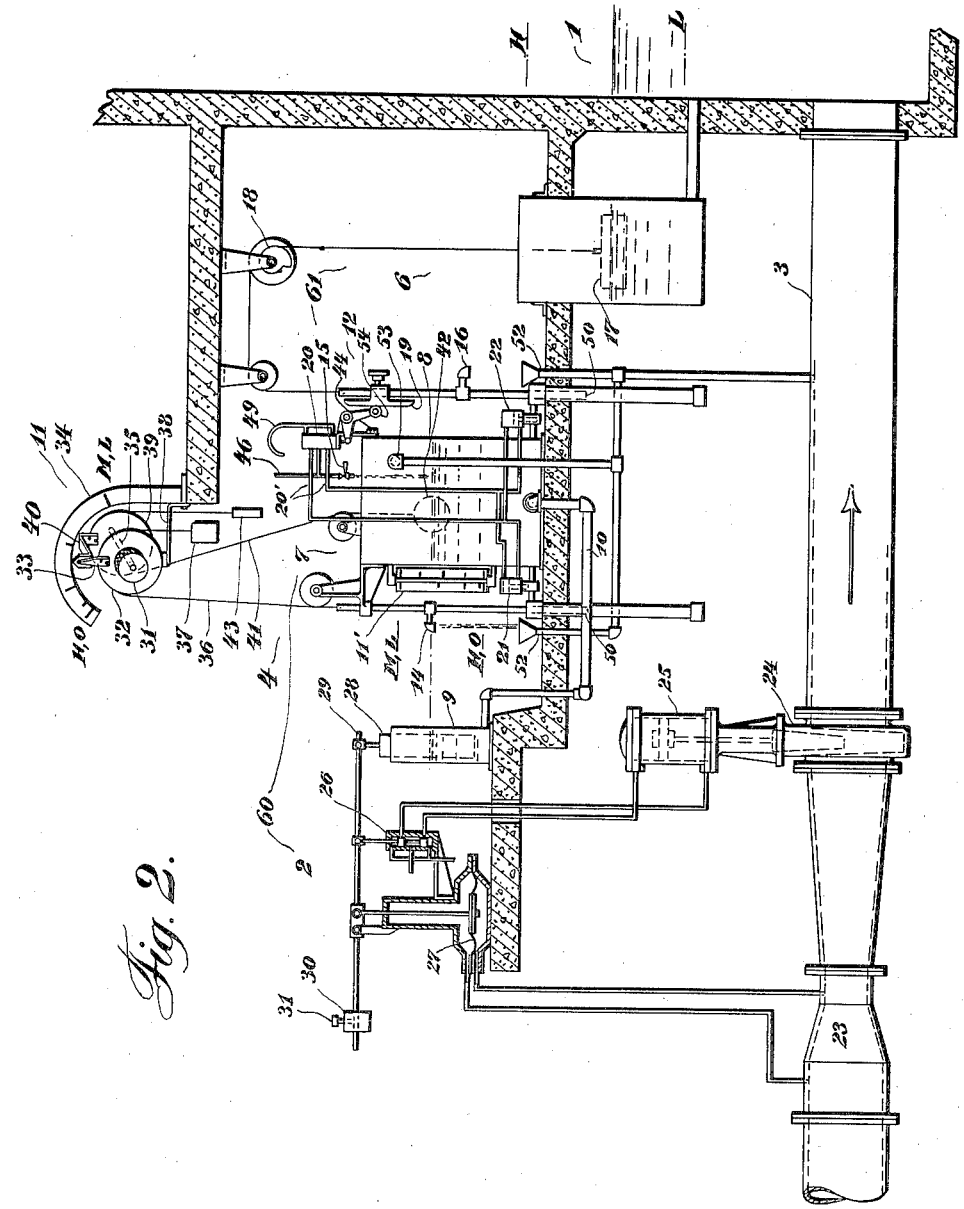

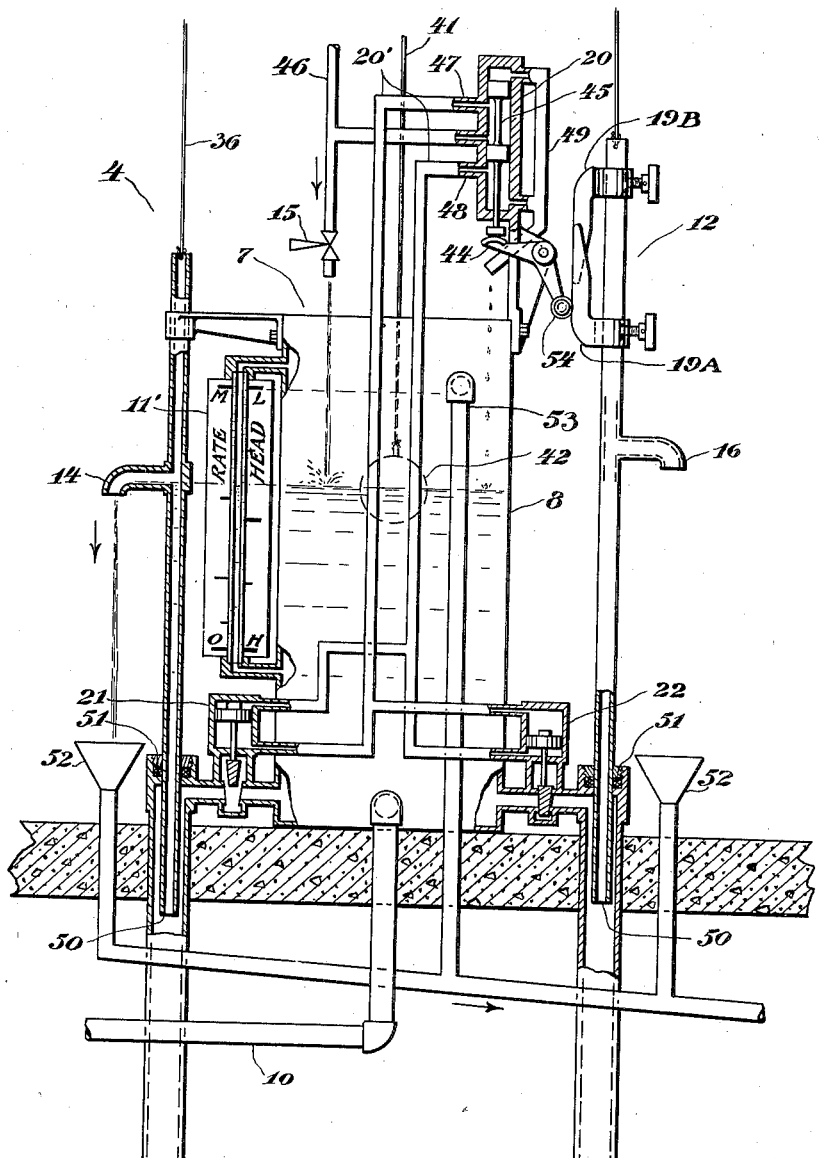

March 2, 1937.  C. G. RICHARDSON  2,072,531
FLOW CONTROL SYSTEM
Filed Feb. 2, 1934  4 Sheets-Sheet 4
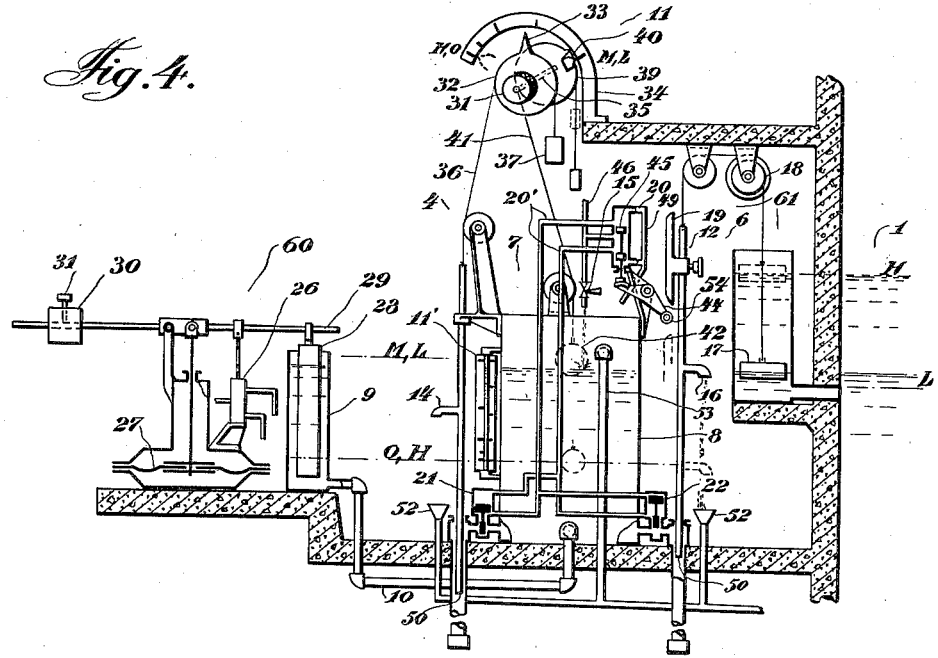
INVENTOR
Charles G. Richardson
BY
Harry Dexter Peck
ATTORNEY Patented Mar. 2, 1937

2,072,531

UNITED STATES PATENT OFFICE 2,072,531

FLOW CONTROL SYSTEM

Charles G. Richardson, Providence, R. I., assignor to Builders Iron Foundry, Providence, R. I., a corporation of Rhode Island Application February 2, 1934, Serial No. 709,474

15 Claims. (Cl. 137—68)

My invention relates to the distribution of liquids, particularly water, and it has for its principal object the automatic rate master control, set from a central point, of the flow through a number of conduits carrying water from one basin to another; the first basin containing raw water supplying a number of filters, the filter beds being between this basin and these conduits; the second basin being the clearwater reservoir, or clearwell, into which the several effluents discharge.

A further object of my invention is to provide clearwell master control means for automatically increasing the rate of flow when the clearwell level falls below a predetermined elevation.

A further object of my invention is to provide clearwell master control means for automatically decreasing the rate of flow of water into the clearwell when the level therein becomes unduly high: e. g. to thus prevent overflow.

I also provide, as a further object of my invention, selective means that automatically changes the control over from the rate master to the clearwell master control means whenever the level of water in the clearwell goes outside of predetermined limits. This is to provide a usual operating range in which the flow is normally controlled at the master rate set, as mentioned above, and at the same time to automatically take care of any unusual demands or conditions that may exist, without requiring the constant attention of an operator.

A further object of my invention, generally, is to provide automatic fluid control means, governed successively by several master means, with selective means controlled by at least one of said master means and adapted to select which of said master means shall govern said automatic control means.

These and other objects of my invention will subsequently appear from the following disclosure.

The nature and characteristic features of my invention will more fully appear by reference to the accompanying drawings, and their description.

In the drawings, Fig. 1 is a side-elevation, general view of a number of flow controllers governed according to my invention as applied to the usual filtration plant; Fig. 2 is a diagrammatic, partially sectional elevation of the preferred form of my invention showing one of a number of rate controllers; Fig. 3, partially in sectional elevation, illustrates a detail of my selective means as applied to the hydraulic control of the filtration plant of Figs. 1 and 2. Fig. 4, generally similar to Fig. 3, illustrates the position of the various operative elements when the clearwell level is either too low or too high for the normal operating range as shown in Fig. 3; and Fig. 5 is a diagrammatic, partially sectional view of a somewhat simpler arrangement than the foregoing embodiments, and also follows the teachings of my invention.

Generally throughout the drawings, in which effluent control means for a water filtration plant are shown, a clearwell reservoir 1 receives the filtered water through a number of flow rate controllers 2, each in an effluent conduit 3 connected to reservoir 1. A rate master control means 4, broadly, is adapted to be manually set by an operator to the normal operating rate at which the filters 5 operate most efficiently. Clearwell master means 6, broadly, is operatively connected to the reservoir 1. Governing means 7, broadly, is selectively controlled by the rate master control means 4 or the clearwell master control means 6 according to the level in reservoir 1. Governing means 7 includes a governing well 8, individual wells 9 and conduit means 10 for connecting them. The level of liquid in said wells 8 and 9 corresponds with the rate of flow to be maintained by the individual rate controllers 2 in conduits 3, each individual rate controller 2 having its individual well 9 connected by conduit means 10 to the governing well 8. The level in the governing well 8, and consequently in the individual wells 9, is indicated upon a gauge 11 also showing the rate at which the master rate control 4 is set so that any temporary deviation from a set rate is instantly apparent to the operator. The selective means 12, responsive to the clearwell level, operatively connects either the rate or clearwell master control means, 4 or 6, with the governing means 7.

Figs. 1 and 2 show rate and clearwell master control means 4 and 6 for controlling the rate of flow through a number of effluent conduits 3; Fig. 2 shows the details more clearly including those of one of the individual rate controllers 2, and especially the selective means 12 for changing over the control when the level in the reservoir 1 goes outside the range of elevations for normal operation. In addition, a gauge 13, shown in Fig. 1, is provided to indicate the liquid elevation in the clearwell reservoir 1, this gauge 13 being connected with the clearwell master control means 6 also actuating the selective means 12.

The manually operative rate master control 4 positions an overflow 14 for the governing well 8 so that, with water continuously supplied through valve 15, the liquid level in the governor well 8 may be maintained at the set height of the overflow 14.

A similar overflow 16 is actuated by a float 17 positioned responsive to the clearwell liquid level. The travel of this overflow 16 must equal that of the other 14, and this travel must be large enough to ensure prompt and accurate response in the individual wells 9 when connected by reasonable size conduit means 10 with the governing well 8. In some cases the permissible clearwell level variation is very small for the full rate variation from zero to maximum, and also these may require wide rate changes at certain elevations as compared with others. For these cases, a variable-radius multiplying pulley 18 is used to increase as desired the travel of overflow 16 relative to that of the float 17. This overflow 16 is adapted to maintain levels in the governing well 8 corresponding inversely to the height of the overflow 16 and hence to the water level in the clearwell reservoir 1. A cam 19 is attached to the overflow means 16 to coact with a pilot valve 20, and small hydraulically-operated valves 21 and 22 are connected by piping 20' to pilot valve 20 and are controlled thereby to alternately connect the master rate overflow 14 and the clearwell level responsive overflow 16 with the governing well.

In a broad sense then, the fluid controlling means 60 comprises rate control means 2 and the governing means 7 therefor, the master means 61 comprises the rate and clearwell master control means 4 and 6, while the selective means 12 comprises cam 19 (actuated by the clearwell master control means 6), pilot valve 20, and hydraulically-operated valves 21 and 22 connected thereto by piping 20'.

Fig. 2, of the preferred embodiment shows one of the individual rate controllers 2 having a Venturi tube inlet section 23 producing a differential pressure corresponding to the rate of flow therethrough, which is also the rate of flow through its conduit 3. The differential responsive rate control means 2, broadly, is actuated by this Venturi differential in a well-known manner. Control valve 24 is preferably hydraulically-actuated as by the hydraulic piston-and-cylinder means 25, connected to the usual pilot valve 26, which in turn is operated by the familiar differential responsive means 27, shown as a diaphragm. This means has a poise 28 attached to a portion 29 thereof, and suspended in a liquid-containing well 9 that, along with other wells 9 for similar units 2, is connected to the governing well 8 of the governing means 7, broadly. The poise 28 is opposed to a counterweight 30 to balance the poise 28 when the liquid level in well 9 is at the elevation 0 corresponding with the zero rate of flow.

The rate master control means 4, partially shown in perspective, has a setting knob 31. Attached to this knob 31 is a master control pulley 32 having an attached rate indicator 33, indicating the rate set on scale 34, connected to said pulley 32 which is mounted on a shaft 35. The master control overflow means 14 is attached to the pulley 32 by a cord 36 that also is attached to a counterweight 37 that substantially balances the weight of the overflow means 14. Friction brake means 38 are provided for pulley 32 to retain it in its last set position and so maintain the last set rate until the operator again moves the setting knob 31. Loosely and rotatably mounted on this shaft 35 is a second pulley 39 having a float-operated indicator 40 attached thereto for indicating the rate corresponding with the actual level in the governing well 8 on the same scale 34 that shows the rate set. This second pulley 39 has attached thereto a cord 41 having a float 42 at one end, and a counterweight 43 at the other, the float being in the governing well 8.

Cooperating with the overflow means 14 and 16 is a water supply valve 15 continuously supplying water to maintain the level in governing well 8 and the individual wells 9 at the level of the overflow 14 or 16 depending upon which is then operatively connected.

It is thus obvious that the level of water in clearwell reservoir 1 operates clearwell master control means 6 broadly, that operates the selective means 12 to determine whether the rate master control means 4 broadly, or the clearwell master control means 6 broadly, shall control the liquid level in the governing well 8 and the individual rate controller wells 9. Thus I have provided a rate master control means 4 for maintaining a number of effluent controllers 2 on conduits 3 at a normal operating rate as long as the level in the clearwell reservoir 1 remains within the limits corresponding with the length of the cam 19. It is obvious, however, that when the level in reservoir 1 is either above or below the limits corresponding with the ends of the cam 19, the valve 21 will disconnect the rate master overflow means 14 from the governing well 8 and valve 22 will connect the clearwell master overflow means 16 with the governing well 8 to bring the level in this well 8 to that of the latter overflow 16 so that if the level in reservoir 1 is too low, as at L generally, the rate will be automatically increased, and thus tend to raise this level; while if the level in reservoir 1 is too high, as at H generally, the rate will be automatically decreased: e. g., to thus prevent the overflow of reservoir 1.

In Fig. 3, the governing well 8, the overflow means 14 and 16 respectively for the rate and clearwell master rate control means 4 and 6, and the selective means 12 therefor are shown and described for the normal operating condition; in which condition bellcrank 44 coacts with the cam 19 to raise the piston 45 of the pilot valve 20 to its uppermost position, as shown in section. The water supply to the governing well 8 is controlled by a valve 15 on the supply line 46 that also supplies water under line pressure to the pilot valve 20. As shown, the raised piston 45 opens the upper port 47 and so connects this water pressure with the opening side of the hydraulically-operated valve 21 connecting the master rate overflow 14 with the governing well 8, and this pressure is also admitted to the closing side of the hydraulically-operated valve 22 to disconnect the clearwell level responsive overflow 16 from the governing well 8. The pilot valve piston 45 also uncovers the lower port 48 and so connects it to the drain 49 so that the pressure is released from the other sides of the hydraulically-operated valves' pistons to permit these valves 21 and 22 to operate.

Each overflow, 14 or 16, has a lower end 50 consisting of a smooth cylindrical pipe passing through a stuffing box 51 therefor, permitting vertical, longitudinal movement of the pipe 51 and overflow without appreciable leakage. Any water from the overflows 14 and 16 falls into the waste drains 52 adapted to catch the spillage. A fixed maximum level overflow 53 is attached to the governing well 8 near its upper end and leads into the waste drain 52. This drain preferably carries any wastage into the clearwell 1 either directly, or by emptying into one of the conduits 3, as shown in Fig. 2. Thus, any water used for operating this rate or clearwell master control 4 or 6 is not wasted, but is saved in the clearwell 1 for use, where this is permitted by the local regulations.

As shown in Fig. 3, cam 19 is preferably composed of two parts, 19A and 19B, individually adjustable and respectively controlling the lower and upper points of coaction of the cam and pilot valve bellcrank 44. In this construction, the contacting roller 54 of bellcrank 44 is of sufficient width to coact with both parts 19A and 19B of the cam 19, which parts are arranged side by side. In operation, the great advantage of this construction is that it permits one selecting point to be varied without affecting the other, as would be the case if a unitary cam 19 of fixed length were used, as shown in the other views.

There is a relation between the normal, operating rate set on the rate master control means 4 and the level in clearwell 1 and hence that of the clearwell master overflow 16 as shown on scale 34 of gauge 11 and also by water column 11' on the side of the governing wells. Thus, when the normal, operating rate is set by manually adjusting knob 31 to a new position, the cam 19 likewise may be reset to have the bellcrank 44 in its middle, substantially, so that the flow controllers 2 will operate normally at the set rate. In usual filtration operation, however, cam 19 is long enough so that the above adjustment is not needed after its initial setting at the time of installation.

Fig. 4, solid lines, shows the operative relation between the working parts of the selecting means 12 when the clearwell level is lower than is desirable in normal operation. The cam 19 is clear above the bellcrank 44 so that the pilot valve piston 45 drops of its own weight to disconnect the rate master control means 4 and connect the clearwell master control means 6 with the governor well 8. The level in the governor well 8 then rises, due to the continuous stream flowing in from the supply line 46 until water overflows through the clearwell master overflow 16 to maintain a level increased above that for the set normal rate. This condition is maintained until the clearwell level again rises so that the cam 19 moves the bellcrank 44 and pilot valve piston 45 to disconnect the clearwell master overflow 16 from, and reconnect the rate master overflow 14 with, the governing well 8. It is obvious from an earlier description that the individual rate control wells 9 will have the same level as that in the governing well 8. The departure of the actual rate from that set is evident on the dial 34 of the gauge 11. The arrangement is such that the actual rate can never exceed the maximum M at which it is safe to operate the filters.

Fig. 4, dotted lines, shows the relation between the operating parts of the selecting means 12 when the clearwell level is too high. The cam 19 again clears the the bellcrank 44, being clear below it, and lets the pilot valve piston 45 drop to operatively connect the clearwell master overflow 16 with, and disconnect the rate master overflow 14 from, the governing well 8. The extreme low position of the clearwell master overflow 16 causes the rate to be diminished, from that set, to the point where it may completely shut off all of the rate controllers 2 on the conduits 3 supplying effluent to the clearwell reservoir 1: e. g. so that this reservoir 1 cannot be filled to overflow. Here again, the gauge 11 shows the difference between the actual flow rate and the manually set master rate. Obviously when the clearwell level again drops to within its normal operating range, the cam 19 will then engage the bellcrank 44 of the selective means 12 to cause the rate master overflow 14 to be again connected with, and the clearwell master overflow 16 to be disconnected from, the governing well 8; whereupon the relation of the parts will be as earlier shown in Figs. 2 and 3 for maintaining normal operating conditions.

Fig. 5 shows a modified embodiment of my invention, in which the clearwell level ranges between elevations L and H which are between the bottoms and tops of the governing well and individual controller wells. This permits of some simplification and also reduction in both first and operating cost. Instead of having an overflow 16 positioned in accordance with the level in the clearwell 1 and connected to the governing well 8, this well 8 is directly connected with the clearwell 1 when the hydraulically-operated valve 22 is opened. An inversion of the relation between the head in the governor well 8 and the clearwell 1 occurs as compared with previously shown embodiments: i. e. as the level in the clearwell 1 rises, the level in the governing well 8 now rises also, whereas before it fell when there was a rise of water in the clearwell 1. On account of this inversion, the level H in the governor well 8 is near the top for zero rate-of-flow O, and is near the bottom L for the maximum rate-of-flow M. Consequently it is necessary to put the poise 28 on the opposite side of the individual differential responsive means 27 so that the diaphragm now opposes the poise 28, whereas in the earlier embodiments it acted in the same direction therewith.

Another advantage of this modification is that, under abnormal, emergency conditions, the level in the governing well 8 and the individual rate control wells 9 most rapidly responds to changes of level in the clearwell 1. When going back to the normal rate control 4 a less rapid response is needed and a small stream from supply line 46 is adequate, requiring a minimum amount of water trickling into the governor well 8. As shown in Fig. 5, the valve 15 on the supply line 46 may be connected to the bellcrank 44 as by the link 55 so that no water is supplied therefrom to the governor well 8 except when the valve to the clearwell is closed.

In the claims, the following definitions are applied:

A regulator or regulating means comprises a metering means responsive to the departure of a variable from a predetermined value, controlling means for altering the actual value of said variable, and governing means connecting said meter and controller to regulate said variable in a predetermined manner.

A master means comprises a means for setting the said predetermined value at said meter.

A selective means comprises a means for governing the connection of any selected one of a number of master means to the meter of said regulator to thereby set said predetermined regulating value.

I claim:

1. A fluid regulating system comprising, in combination, flow regulating means, master control means normally controlling the operation of said regulating means, a second master control means also capable of controlling the operation of said regulating means, and means responsive to said second master control means for simultaneously disconnecting the first mentioned master control means and transferring the control of said regulating means to the said second master control means.

2. A fluid regulating system comprising, in combination, a reservoir for liquid, a number of conduits connected thereto, flow regulating means associated with each conduit, master control means normally controlling the operation of said regulating means, a second master control means responsive to the liquid level in said reservoir, and means actuated by said second master control means for connecting one of said master control means to said regulating means and simultaneously disconnecting the other master control from said regulating means in accordance with predetermined changes of the liquid level in said reservoir.

3. In a liquid control system for controlling the level in a reservoir, a governing well, a number of wells, means for supplying liquid to said wells, conduit means for connecting said wells, said wells being adapted to contain said liquid at a level therein corresponding to the governing quantity, two master overflow means, one comprising means responsive to said reservoir level, selective cam means actuated by said reservoir level responsive means, pilot valve means for coacting with said cam means, hydraulically-operable valve means connected to said wells by said pilot valve means for operatively connecting the selected of said master overflow means and disconnecting the other of said master overflow means.

4. In a fluid control system, master means, a governing well, governed wells, conduit means connecting said wells to maintain a liquid at a common level therein, and selective means responsive to at least one of said master means and adapted to operatively connect the selected of said master means to said governing well so that the level in all said wells may correspond with the then condition of said selected master means.

5. In a fluid control system, master overflow means, wells adapted to contain a liquid at a significant level therein, a liquid supply for raising the level in said wells, and selective means for connecting the selected of said master overflow means to said wells to lower the liquid level therein to that of said selected overflow.

6. In a liquid control system, a reservoir for said liquid, well means having a level of liquid therein, master overflow means, and selective means for selectively connecting said reservoir itself or said master overflow means with said governing well means.

7. A fluid regulating system comprising, in combination, a reservoir for liquid whose level is subject to change, a conduit connected thereto, flow regulating means for said conduit, and means responsive to predetermined changes of the liquid level in said reservoir and controlling the operation of said regulating means, the said level responsive means comprising means which variably multiplies the response to said level changes to effect control of the regulating means in a predetermined variable relation to said level changes.

8. A fluid regulating system comprising, in combination, a reservoir for liquid whose level is subject to change, a conduit connected thereto, flow regulating means in said conduit, control means for controlling the operation of said regulating means, and means responsive to the liquid level of said reservoir for rendering said control means inactive when the liquid level of said reservoir passes above a predetermined upper limit and below a predetermined lower limit, the last said means being separately adjustable with respect to said upper and lower limits of liquid level.

9. In a liquid control system, a reservoir, a conduit connected thereto, rate control means actuated by the flow in said conduit for normally maintaining a constant rate therein, separate controlling means for affecting the rate in said conduit, and means for selecting which of said control means shall govern said rate control means adapted to act at the limits of said normally constant rate to restore the level of said reservoir so that said constant rate will again exist.

10. In liquid control apparatus, the combination of a reservoir; conduits connected thereto; individual rate control means for each of said conduits; governing means having a liquid level therein for determining the rate of said rate control means comprising a governing well, an individual well for each control means and liquid level responsive means therein operatively connected to said rate control means for setting the rate thereof corresponding to said liquid level, and conduit means connecting said wells to maintain a common liquid level therein; master means comprising means for supplying liquid to said wells for raising said liquid level therein, rate master overflow means manually settable to a level corresponding to a desired normal constant operating rate and reservoir master overflow means positioned responsive to said reservoir level, said overflow means being adapted to lower the level in said wells to that corresponding with said overflow means, said master means including a float in said governing well responsive to the said liquid level therein, two rate indicators and a common scale, one of said indicators being connected to said rate master overflow means to indicate the normal rate set thereby, the other of said indicators being attached to said float to indicate the actual control rate corresponding with the accompanying well-liquid level; and selective means for operatively connecting the selected of said master means to said governing means comprising cam means adjustably attached to the said master means responsive to said reservoir level, pilot valve means for normally coacting with said cam means, hydraulically-operable valve means actuatable by said pilot valve means for operatively connecting the selected of said master means to said governing means; all of said above means being adapted to cooperate to normally maintain a constant manually-set rate through said controllers and to modify said flow rate correspondingly with said reservoir level when said reservoir level goes outside of predetermined limits of normal operation.

11. In a system for controlling the rate of flow of liquid into, or from, a reservoir at a level therein; the combination of governing well means having a liquid level therein corresponding with said flow rate; a continuous supply of liquid for said well; two separate master overflow means positioned responsively to said flow rate and reservoir level; and selective means actuated by said reservoir level to connect either of said master overflow means with, and simultaneously disconnect the other of said master overflow means from, said governing well means.

12. The method of regulating the flow of a liquid which comprises controlling the flow at a predetermined rate so long as a liquid level influenced by said flow is between predetermined limits and controlling the flow at a rate dependent upon the variations of said level when said level is outside of said limits.

13. The method of regulating the flow of a liquid which comprises controlling the flow at a predetermined rate so long as a variable depending upon said flow is within given limits and controlling the flow at a rate depending upon said variable when it is outside of said limits.

14. A fluid regulating system comprising, in combination, means for regulating the rate of flow of liquid, means normally controlling said regulating means when a liquid level influenced by said flow is within a predetermined range, and other means responsive to all levels of said liquid and capable upon said level passing out of said range of assuming control of said regulating means and discontinuing the control of the first mentioned control means.

15. A fluid regulating system comprising, in combination, means for regulating the rate of flow of liquid, master control means normally controlling the said regulating means when a level of liquid is within a normal range, a second master control means for controlling said regulating means when said level is outside of said range, and means actuated by said second master control means upon assuming control of the regulating means for rendering the first mentioned master control means inactive.

CHARLES G. RICHARDSON.